(12) United States Patent
Ke

(10) Patent No.: US 12,369,021 B2
(45) Date of Patent: Jul. 22, 2025

(54) TERMINAL CAPABILITY IDENTIFIER OPERATION METHOD AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 359 days.

(21) Appl. No.: 17/553,088

(22) Filed: Dec. 16, 2021

(65) Prior Publication Data

US 2022/0109975 A1  Apr. 7, 2022

Related U.S. Application Data

(63) Continuation of application No. PCT/CN2020/098540, filed on Jun. 28, 2020.

(30) Foreign Application Priority Data

Jun. 28, 2019 (CN) .......................... 201910578775.X

(51) Int. Cl.
*H04W 8/22* (2009.01)
*H04W 76/27* (2018.01)

(52) U.S. Cl.
CPC ............. *H04W 8/22* (2013.01); *H04W 76/27* (2018.02)

(58) Field of Classification Search
CPC ................................ H04W 36/14; H04W 8/22
See application file for complete search history.

(56) References Cited

U.S. PATENT DOCUMENTS

| 9,775,057 | B2 | 9/2017 | Feng et al. | |
|---|---|---|---|---|
| 10,887,761 | B2* | 1/2021 | Wu | H04W 76/27 |
| 2011/0230723 | A1* | 9/2011 | Castro | A61B 90/50 |
| | | | | 600/205 |
| 2012/0309431 | A1 | 12/2012 | Bodog | |
| 2013/0322302 | A1* | 12/2013 | Gholmieh | H04W 76/30 |
| | | | | 370/328 |
| 2014/0040504 | A1 | 2/2014 | Gupta | |
| 2015/0172965 | A1* | 6/2015 | Jeong | H04W 36/142 |
| | | | | 370/331 |
| 2015/0208456 | A1 | 7/2015 | Guo et al. | |
| 2019/0141586 | A1* | 5/2019 | Olsson | H04W 72/54 |

(Continued)

FOREIGN PATENT DOCUMENTS

| CN | 107404717 A | 11/2017 |
|---|---|---|
| CN | 109257741 A | 1/2019 |

(Continued)

OTHER PUBLICATIONS

Vivo, "Correction on support of RACS", SA WG2 Meeting #134, S2-1907933, Jun. 24-28, 2019, Sapporo, Japan.

(Continued)

*Primary Examiner* — Dai Phuong
(74) *Attorney, Agent, or Firm* — Price Heneveld LLP

(57) ABSTRACT

Embodiments of this disclosure provide a terminal capability identifier operation method and a communications device. The operation method includes: deleting a terminal capability identifier in a case that a first condition is met; and/or retaining the terminal capability identifier in a case that a second condition is met.

12 Claims, 2 Drawing Sheets

Delete a terminal capability identifier in a case that a first condition is met; and/or retain the terminal capability identifier in a case that a second condition is met — 11

(56) References Cited

U.S. PATENT DOCUMENTS

| | | | |
|---|---|---|---|
| 2021/0274346 A1* | 9/2021 | Suh | H04L 63/205 |
| 2021/0329444 A1* | 10/2021 | Wiemann | H04W 8/24 |
| 2021/0345096 A1* | 11/2021 | Shi | H04W 8/24 |
| 2022/0174557 A1* | 6/2022 | He | H04W 8/22 |

FOREIGN PATENT DOCUMENTS

| | | |
|---|---|---|
| RU | 2656715 C1 | 6/2018 |
| WO | 2014047949 A1 | 4/2014 |
| WO | 2018006658 A1 | 11/2018 |
| WO | 2020168834 A1 | 8/2020 |

OTHER PUBLICATIONS

Vivo, "Correction on support of RACS", SA WG2 Meeting #134, S2-1907831, Jun. 24-28, 2019, Sapporo, Japan.

Nokia, "Addressing switching and coexistence between PLMN assigned and UE manufacturer assigned UE capabilities IDs", SA WG2 Meeting #133, S2-1904986, May 13-17, Reno, Nevada, USA.

Oppo, Procedure for PLMN assigned capability ID deletion, SA WG2 Meeting #132, S2-1903217, Apr. 8-12, 2019, Xi'an, China.

Vivo, Plmn assigned Radio Capability ID transfer during Inter PLMN mobility, SA WG2 Meeting #134, S2-1907829, Jun. 24-28, 2019, Sapporo, Japan.

Vivo, "PLMN assigned Radio Capability ID transfer during Inter PLMN mobility", SA WG2 Meeting #134,S2-1906935, Jun. 24-28, 2019, Sapporo, Japan.

"3rd Generation Partnership Project; Technical Specification Group Radio Access Network; Study on optimizations of UE radio capability signalling; NR / Evolved Universal Terrestrial Radio Access Network (E-UTRAN) aspects (Release 16)", 3GPP TR 37.873 V0.1.0 (Mar. 2019), Valbonne, France.

MediaTek Inc. et al. "RACS_UE manufacturer specific ID revert", SA WG2 Meeting #130, S2-1902436 Feb. 25-Mar. 1, 2019, Santa Cruz-Tenerife, Spain.

* cited by examiner

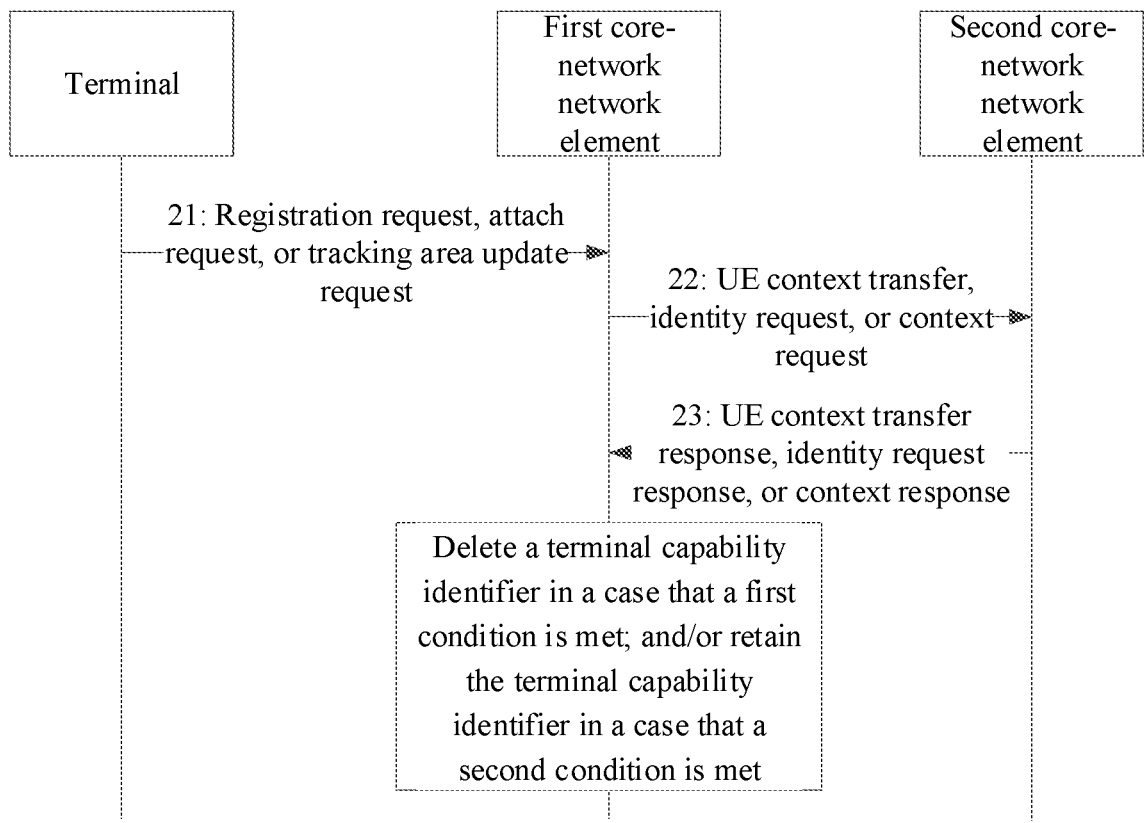

TERMINAL CAPABILITY IDENTIFIER OPERATION METHOD AND COMMUNICATIONS DEVICE

CROSS-REFERENCE TO RELATED APPLICATIONS

This application is a continuation application of International Application No. PCT/CN2020/098540 filed on Jun. 28, 2020, which claims priority to Chinese Patent Application No. 201910578775.X filed in China on Jun. 28, 2019, which are incorporated herein by reference in their entireties.

TECHNICAL FIELD

Embodiments of this disclosure relate to the field of wireless communication technologies, and in particular, to a terminal capability identifier operation method and a communications device.

BACKGROUND

As networks evolve, a terminal needs to support an increasing number of capabilities, and the terminal also needs to report an increasing number of capabilities to the network. The capability reporting in turn leads to an increasing air interface load.

In order to reduce overheads resulting from terminal capability reporting, an identifier of a terminal capability may be set for the terminal. The identifier of the terminal capability (which may be referred to as the terminal capability identifier for short) may be used to identify a terminal capability set. There is a mapping relationship between the terminal capability identifier and the terminal capability set, and the terminal capability set may be obtained through mapping based on the terminal capability identifier. Because a size of related information of a terminal capability identifier is smaller than that of a terminal capability, capability signaling overheads can be reduced.

The related information of the terminal capability identifier may be allocated by the network or allocated by a terminal manufacturer. One terminal capability set may have both related information of a terminal capability identifier allocated by the network and related information of a terminal capability identifier allocated by a terminal manufacturer.

Because the terminal may have related information of a plurality of terminal capability identifiers, how to securely use the related information of the terminal capability identifiers is a technical problem that needs to be resolved at present.

SUMMARY

Embodiments of this disclosure provide a terminal capability identifier operation method and a communications device, so as to resolve a problem of how to securely use related information of terminal capability identifiers.

In order to resolve the foregoing technical problem, this disclosure is implemented as follows.

According to a first aspect, an embodiment of this disclosure provides a terminal capability identifier operation method, applied to a first communications device and including: deleting a terminal capability identifier in a case that a first condition is met; and/or retaining the terminal capability identifier in a case that a second condition is met.

The first condition includes at least one of the following:
a terminal moves between networks;
none of terminal capability identifiers in a source network are applicable to a target network;
a terminal moves between networks, and none of terminal capability identifiers in a source network are applicable to a target network; or
a terminal moves between networks, a terminal capability identifier is received from a second communications device, and none of terminal capability identifiers in a source network are applicable to a target network.

The second condition includes at least one of the following:
all terminal capability identifiers in a source network are applicable to a target network;
a terminal moves between networks, and all terminal capability identifiers in a source network are applicable to a target network; or
a terminal moves between networks, a terminal capability identifier is received from a second communications device, and all terminal capability identifiers in a source network are applicable to a target network.

According to a second aspect, an embodiment of this disclosure provides a first communications device, including:
an execution module, configured to delete a terminal capability identifier in a case that a first condition is met; and/or the execution module, configured to retain the terminal capability identifier in a case that a second condition is met.

The first condition includes at least one of the following:
a terminal moves between networks;
none of terminal capability identifiers in a source network are applicable to a target network;
a terminal moves between networks, and none of terminal capability identifiers in a source network are applicable to a target network; or
a terminal moves between networks, a terminal capability identifier is received from a second communications device, and none of terminal capability identifiers in a source network are applicable to a target network.

The second condition includes at least one of the following:
all terminal capability identifiers in a source network are applicable to a target network;
a terminal moves between networks, and all terminal capability identifiers in a source network are applicable to a target network; or
a terminal moves between networks, a terminal capability identifier is received from a second communications device, and all terminal capability identifiers in a source network are applicable to a target network.

According to a third aspect, an embodiment of this disclosure provides a communications device, including a processor, a memory, and a computer program stored in the memory and capable of running on the processor, where when the computer program is executed by the processor, the steps of the foregoing terminal capability identifier operation method are implemented.

According to a fourth aspect, an embodiment of this disclosure provides a computer-readable storage medium, where the computer-readable storage medium stores a computer program, and when the computer program is executed by a processor, the steps of the foregoing terminal capability identifier operation method are implemented.

In the embodiments of this disclosure, the terminal capability identifier is deleted in the case that the first condition is met; and/or the terminal capability identifier is retained in the case that the second condition is met. This can ensure secure and reliable use of the terminal capability identifier by the network and ensure that the terminal accesses the network to obtain network services.

BRIEF DESCRIPTION OF DRAWINGS

Other advantages and benefits will become apparent to those of ordinary skill in the art by reading the following detailed descriptions of the optional implementations. The accompanying drawings are merely intended to illustrate the purposes of the optional implementations, and should not be construed as a limitation on this disclosure. Throughout the accompanying drawings, the same reference numerals represent the same components. In the accompanying drawings:

FIG. 1 is a schematic flowchart of a terminal capability identifier operation method according to an embodiment of this disclosure;

FIG. 2 is a schematic flowchart of another terminal capability identifier operation method according to an embodiment of this disclosure;

DETAILED DESCRIPTION OF THE EMBODIMENTS

Figure 3:
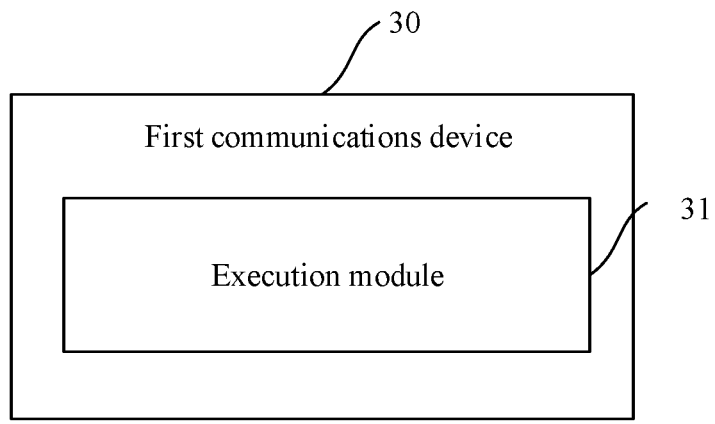
FIG. 3 is a schematic structural diagram of a first communications device according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the specification and claims of this application, the terms "include", and any other variants thereof are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: A alone, B alone, or both A and B.

In the embodiments of this disclosure, terms such as "an example" or "for example" are used to represent examples, illustrations, and explanations. Any embodiment or design solution described as "an example" or "for example" in the embodiments of this disclosure shall not be interpreted to be more optional or advantageous than other embodiments or design solutions. Specifically, the terms such as "an example" or "for example" are intended to present a related concept in a specific manner.

Technologies described in this specification are not limited to a 5th-generation mobile communication technology (5G) system, a later evolved communications system, and an LTE or LTE advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system may implement radio technologies such as global system for mobile communications (GSM). The OFDMA system may implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (for example, LTE-A) are new UMTS versions that use E-UTRA. UTRA, E-UTRA, UMTS, LTE, LTE-A, and GSM are cited from descriptions of the documentation of the organization named "3rd Generation Partnership Project" (3GPP). CDMA2000 and UMB are cited from descriptions of the documentation of the organization named "3rd Generation Partnership Project 2" (3GPP2). Techniques described in this specification may be used in the aforementioned systems and radio technologies, and may also be used in other systems and radio technologies.

For better understanding of the embodiments of this disclosure, the following technical points are first described.

1. Terminal Capability

First, it should be noted that capabilities of a terminal may be classified into a radio capability and a core network capability. For the radio capability, the terminal may report the radio capability of the terminal based on a request from a network. For the core network capability, the terminal may report the network capability of the terminal during registration. The terminal may support a plurality of bands and frequencies. With the introduction of technologies such as carrier aggregation (CA) and dual connectivity (DC), various possible band combinations need to be arranged, and band combinations supported by various terminal manufacturers may be different, resulting in an extremely large number of radio capabilities. In addition, with the evolution of networks, an increasing number of features are introduced into the networks, and different radio capabilities and network capabilities are usually required for different features. For a related network feature, the terminal needs to inform the network of information about whether the feature is supported.

2. Related Information of Terminal Capability Identifier

In order to reduce overheads resulting from terminal capability reporting, an identifier of a terminal capability may be set for the terminal. The identifier of the terminal capability (which may be referred to as the terminal capability identifier for short) may be used to identify a terminal capability set. There is a mapping relationship between the terminal capability identifier and the terminal capability set, and the terminal capability set may be obtained through mapping based on the terminal capability identifier. A method for terminal capability signaling optimization is that a terminal reports only related information of an identifier indicating a terminal capability to a network. The network may obtain the terminal capability set through mapping based on the related information of the terminal capability identifier. Because a size of related information of a terminal capability identifier is smaller than that of a terminal capability, capability signaling overheads can be reduced. The function may be referred to as terminal capability optimization.

The related information of the terminal capability identifier may be allocated by the network or allocated by a terminal manufacturer.

In a manner of allocating the related information of the terminal capability identifier by the terminal manufacturer, the terminal merely needs to report, to the network, the related information of the terminal capability identifier allocated by the terminal manufacturer. In a manner of allocating the related information of the terminal capability identifier by the network, the terminal needs to report, to the network, the terminal capability set, and the network then transmits, to the terminal, the related information of the terminal capability identifier obtained through mapping based on the terminal capability set. Therefore, the two manners correspond to different network behaviors, and also correspond to different network capabilities.

One terminal capability set may have both a terminal capability identifier allocated by a network and a terminal capability identifier allocated by a terminal manufacturer, only a terminal capability identifier allocated by a network, only a terminal capability identifier allocated by a terminal manufacturer, or no terminal capability identifier.

The terminal capability identifier allocated by the terminal manufacturer may be simply referred to as a terminal-manufacturer-related terminal capability identifier. The terminal capability identifier allocated by the network may be simply referred to as a network-related terminal capability identifier.

In order to support terminal capability signaling optimization, the following problem needs to be resolved.

Problem: When a terminal moves between networks (for example, between public land mobile networks (PLMN)), a terminal capability identifier obtained by a target network from a source network may have security risks. When a communications device of the source network transmits the terminal capability identifier of the terminal to a communications device of the target network, the terminal capability identifier of the terminal may be changed. The changed terminal capability identifier may indicate a wrong terminal capability, which may make the terminal unable to be used properly in the target network.

It should be noted that, in the embodiments of this disclosure, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of this disclosure. For example, when one specific piece of capability indication information is not received from a device, it may be deduced that the device does not support the capability.

It should be noted that, in the embodiments of this disclosure, transmitting may include broadcasting, broadcasting through a system message, or returning a response after receiving a request.

In an optional embodiment of this disclosure, the communications network element may be one of the following: a physical device, a network function, and a network element.

Optionally, one terminal may have related information of one or more terminal capability identifiers.

In an optional embodiment of this disclosure, a terminal capability, terminal capability information, and a terminal capability set may mean the same.

In an optional embodiment of this disclosure, "related information of a capability identifier", "related information of a terminal capability identifier", and "related information of an identifier of terminal capability" may mean the same.

In an optional embodiment of this disclosure, the network-related terminal capability identifier may also be referred to as the terminal capability identifier allocated by the network.

In an optional embodiment of this disclosure, the terminal-manufacturer-related terminal capability identifier may also be referred to as the terminal capability identifier allocated by the terminal manufacturer.

In an optional embodiment of this disclosure, the terminal capability identifier may be understood as a current terminal capability identifier. The current terminal capability identifier may be understood as at least one of the following: related information of a terminal capability identifier corresponding to a current terminal capability set, related information of a valid terminal capability identifier, a latest terminal capability identifier, a latest terminal capability identifier transmitted by the terminal to the network, or a latest terminal capability identifier allocated by the network.

In an optional embodiment of this disclosure, the network is a network that provides access for terminals, may be a network or a dedicated network of a network operator (for example, an operator), or may be a public communications network or a private communications network. In an optional embodiment of this disclosure, the wireless communications network may be at least one of the following: a public network or a non-public network. Optionally, a network identifier of the network may be one of the following: a public network identifier (for example, a PLMN ID), and a non-public network identifier (for example, an NPN ID and/or a PLMN ID used for a non-public network).

In an optional embodiment of this disclosure, the non-public network may be referred to as one of the following: a non-public communications network. The non-public network may include at least one of the following deployment manners: a physical non-public network, a virtual non-public network, or a non-public network implemented on a public network. In an implementation, the non-public network is a closed access group (CAG). A CAG may include a group of terminals.

In an optional embodiment of this disclosure, the non-public network may include or be referred to as a private network. The private network may be referred to as one of the following: a private communications network, a private network, a local area network (LAN), a private virtual private network (PVPN), an isolated communications network, a dedicated communications network, or other names. It should be noted that a naming manner is not specifically limited in the embodiments of this disclosure.

In an optional embodiment of this disclosure, the public network is an abbreviation of the public network. The public network may be referred to as one of the following: a public communications network or other names. It should be noted that a naming manner is not specifically limited in the embodiments of this disclosure.

In an optional embodiment of this disclosure, the communications device may include at least one of the following: a communications network element or a terminal.

In an optional embodiment of this disclosure, the communications network element may include at least one of the following: a core-network network element or a radio-access-network network element.

In the embodiments of this disclosure, a core-network network element (CN network element) may include, but is not limited to, at least one of the following: a core-network device, a core-network node, a core-network function, a core-network network element, a mobility management entity (MME), an access mobility management function (AMF), a session management function (SMF), a user plane function (UPF), a serving gateway (serving GW, SGW), a PDN gateway (PDN), a policy control function (PCF), a policy and charging rules function (PCRF), a GPRS serving support node (SGSN), a gateway GPRS support node (GGSN), or a radio access network device.

In the embodiments of this disclosure, a RAN network element may include, but is not limited to, at least one of the following: a radio access network device, a radio access network node, a radio access network function, a radio access network unit, a 3GPP radio access network, a non-3GPP radio access network, a centralized unit (CU), a distributed unit (DU), a base station, an evolved NodeB (eNB), a 5G base station (gNB), a radio network controller (RNC), a base station (NodeB), a non-3GPP interworking function (N3IWF), an access controller (AC) node, an access-point (AP) device, a wireless local area network (WLAN) node, or an N3IWF.

The base station may be a base transceiver station (Base Transceiver Station, BTS) in a global system for mobile communications (GSM) or code division multiple access (CDMA), and may also be a base station (NodeB) in WCDMA, or may be an evolved NodeB (eNB or e-NodeB, evolved NodeB) in LTE, or a 5G NodeB (gNB). This is not limited in the embodiments of this disclosure.

In the embodiments of this disclosure, UE is a terminal. The terminal may include a relay that supports a terminal function, and/or a terminal that supports a relay function. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile internet device (MID), a wearable device, or an in-vehicle device. It should be noted that a specific type of the terminal is not limited in this embodiments of this disclosure.

Referring to FIG. 1, FIG. 1 illustrates a terminal capability identifier operation method applied to a first communications device according to an embodiment of this disclosure. The operation method includes the following step.

Step 11: Delete a terminal capability identifier (for example, UE Radio Capability ID) in a case that a first condition is met; and/or retain the terminal capability identifier in a case that a second condition is met.

The first condition includes at least one of the following:
a terminal moves between networks;
none of terminal capability identifiers in a source network are applicable to a target network;
a terminal moves between networks, and none of terminal capability identifiers in a source network are applicable to a target network; or
a terminal moves between networks, a terminal capability identifier is received from a second communications device, and none of terminal capability identifiers in a source network are applicable to a target network.

The second condition includes at least one of the following:
all terminal capability identifiers in a source network are applicable to a target network;
a terminal moves between networks, and all terminal capability identifiers in a source network are applicable to a target network;
a terminal moves between networks, a terminal capability identifier is received from a second communications device, and all terminal capability identifiers in a source network are applicable to a target network; or all terminal capability identifiers in a source network are applicable to a target network.

In an optional implementation, that none of terminal capability identifiers in a source network are applicable to a target network is indicated by an operator policy.

In another optional implementation, that all terminal capability identifiers in a source network are applicable to a target network is indicated by an operator policy.

In an optional implementation, the terminal capability identifier is included in a terminal context. When the terminal moves between the networks, the first communications device obtains the terminal context from the second communications device. The terminal context includes the terminal capability identifier. It is easy to understand that when the first communications device determines that the terminal has moved between networks, the first communications device deletes the communication capability identifier and obtains a terminal capability identifier of the terminal again, so as to guarantee secure and reliable use of the terminal capability identifier and reflect a real terminal capability. In another implementation, when the source network is trusted by the target network, the terminal capability identifier may be retained.

The network includes at least one of the following: a PLMN, a stand-alone non-public network (SNPN), or a CAG. Moving between networks is, for example, moving between PLMNs. The terminal moving from the source network to the target network is, for example, the terminal moving from a source PLMN to a target PLMN.

In an optional implementation of this embodiment, the first communications device is a communications device in the target network, and the second communications device is a communications device in the source network.

In an optional implementation of this embodiment, the communications device may include at least one of the following: an MME, an AMF, or UE.

In an optional implementation of this embodiment, the first communications device may include at least one of the following: a target MME or a new MME, and a target AMF or a new AMF. The target MME or the new MME may be a communications device in the target network. The target AMF or the new AMF may be a communications device in the target network.

In an optional implementation of this embodiment, the second communications device may include at least one of the following: a source MME or an original MME, and a source AMF or an original AMF. The source MME or the original MME may be a communications device in the source network. The source AMF or the original AMF may be a communications device in the source network.

In an optional implementation, moving between networks includes at least one of the following: moving between the networks when the terminal is in an idle state, moving between the networks when the terminal is in an inactive state, or moving between the networks when the terminal is in a connected state (for example, inter-network handover).

In an optional implementation, moving from the source network to the target network includes at least one of the following: moving from the source network to the target network when the terminal is in an idle state, moving from the source network to the target network when the terminal is in an inactive state, or moving from the source network to the target network when the terminal is in a connected state (for example, handover from the source network to the target network).

In this embodiment of this disclosure, the terminal capability identifier is deleted in a case that the first condition is met; and/or the terminal capability identifier is retained in a case that the second condition is met, to ensure secure and reliable use of the terminal capability identifier by the network and ensure that the terminal accesses the network to obtain network services.

Embodiment of Application Scenario 1

The embodiment of this application scenario mainly describes a process of deleting related information of an obtained terminal capability identifier by a core-network network element. Referring to FIG. 2, a terminal capability identifier operation method in this embodiment of this disclosure includes the following steps.

Step 21: A terminal transmits a registration request, an attach request, or a tracking area update request to a first core-network network element (for example, a new MME or a new AMF).

Step 22: The first core-network network element (for example, the new MME or the new AMF) transmits a UE context transfer, identity request, or context request message to a second core-network network element (for example, an original MME or an original AMF).

Step 23: The second core-network network element returns a UE context transfer response, identity request response, or context response message to the first core-network network element.

The message includes a terminal capability identifier.

In a case that a first condition is met, the first core-network network element deletes the terminal capability identifier, as described in the embodiment shown in FIG. 1. Details are not repeated herein.

In a case that a second condition is met, the first core-network network element retains the terminal capability identifier, as described in the embodiment shown in FIG. 1. Details are not repeated herein.

After deleting the terminal capability identifier obtained from the second core-network network element, the first core-network network element uses the terminal capability identifier included in step 21 in a case that the terminal capability identifier is included in step 21; or the first core-network network element obtains the terminal capability identifier from a UE radio capability management function (UCMF) in a case that the terminal capability identifier is not included in step 21.

When determining not to delete the terminal capability identifier obtained from the second core-network network element, the first core-network network element may continue to use the terminal capability identifier.

Referring to FIG. 3, an embodiment of this disclosure further provides a first communications device 30. The first communications device 30 includes:

an execution module 30, configured to delete a terminal capability identifier in a case that a first condition is met;

and/or the execution module 30 retains the terminal capability identifier in a case that a second condition is met.

The first condition includes at least one of the following:
a terminal moves between networks;

none of terminal capability identifiers in a source network are applicable to a target network;

a terminal moves between networks, and none of terminal capability identifiers in a source network are applicable to a target network; or a terminal moves between networks, a terminal capability identifier is received from a second communications device, and none of terminal capability identifiers in a source network are applicable to a target network.

The second condition includes at least one of the following:

all terminal capability identifiers in a source network are applicable to a target network;

a terminal moves between networks, and all terminal capability identifiers in a source network are applicable to a target network; or a terminal moves between networks, a terminal capability identifier is received from a second communications device, and all terminal capability identifiers in a source network are applicable to a target network.

In an optional implementation, that none of terminal capability identifiers in a source network are applicable to a target network is indicated by an operator policy.

In another optional implementation, that all terminal capability identifiers in a source network are applicable to a target network is indicated by an operator policy.

In an optional implementation, the terminal capability identifier is included in a terminal context. When the terminal moves between the networks, the first communications device obtains the terminal context from the second communications device. The terminal context includes the terminal capability identifier. It is easy to understand that when the first communications device determines that the terminal has moved between networks, the first communications device deletes the communication capability identifier and obtains a terminal capability identifier of the terminal again, so as to guarantee secure and reliable use of the terminal capability identifier and reflect a real terminal capability. In another implementation, when the source network is trusted by the target network, the terminal capability identifier may be retained.

The network includes at least one of the following: a PLMN, an SNPN, or a CAG. Moving between networks is, for example, moving between PLMNs. The terminal moving from the source network to the target network is, for example, the terminal moving from a source PLMN to a target PLMN.

In an optional implementation of this embodiment, the first communications device is a communications device in the target network, and the second communications device is a communications device in the source network.

In an optional implementation of this embodiment, the communications device may include at least one of the following: an MME, an AMF, or UE.

In an optional implementation of this embodiment, the first communications device may include at least one of the following: a target MME or a new MME, and a target AMF or a new AMF. The target MME or the new MME may be a communications device in the target network. The target AMF or the new AMF may be a communications device in the target network.

In an optional implementation of this embodiment, the second communications device may include at least one of the following: a source MME or an original MME, and a source AMF or an original AMF. The source MME or the original MME may be a communications device in the source network. The source AMF or the original AMF may be a communications device in the source network.

In an optional implementation, moving between networks includes at least one of the following: moving between the networks when the terminal is in an idle state, moving between the networks when the terminal is in an inactive state, or moving between the networks when the terminal is in a connected state (for example, inter-network handover).

In an optional implementation, moving from the source network to the target network includes at least one of the following: moving from the source network to the target network when the terminal is in an idle state, moving between the networks when the terminal is in an inactive state, or moving from the source network to the target network when the terminal is in a connected state (for example, handover from the source network to the target network).

In this embodiment of this disclosure, the terminal capability identifier is deleted in a case that the first condition is met; and/or the terminal capability identifier is retained in a case that the second condition is met, to ensure secure and reliable use of the terminal capability identifier by the network and ensure that the terminal accesses the network to obtain network services.

Figure 4:
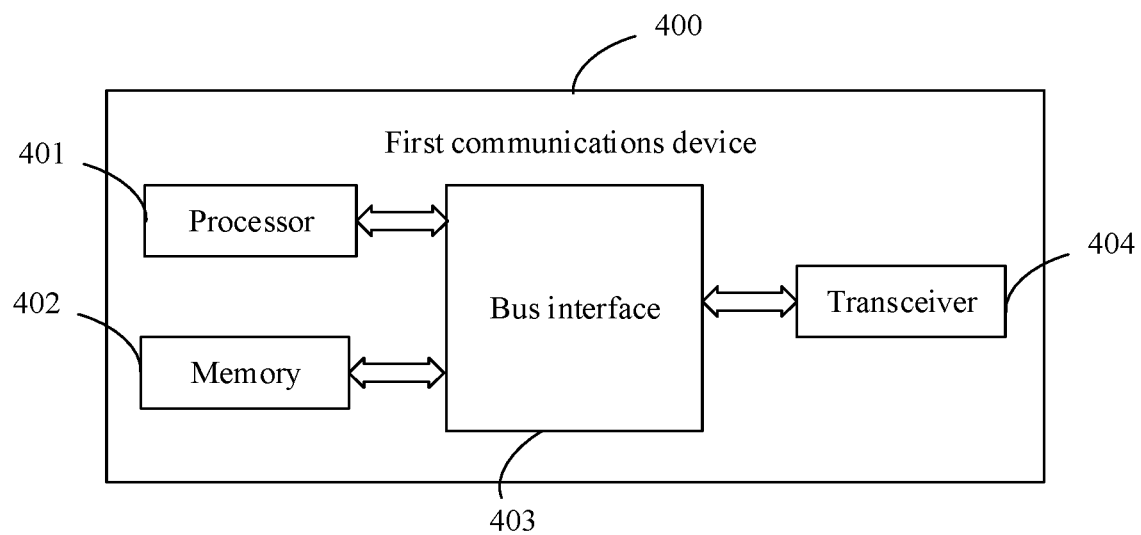
FIG. 4 is a schematic structural diagram of another first communications device according to an embodiment of this disclosure.

Referring to FIG. 4, FIG. 4 is a schematic structural diagram of a first communications device according to another embodiment of this disclosure. As shown in FIG. 4, a first communications device 400 includes: a processor 401, a memory 402, a bus interface 403, and a transceiver 404, where the processor 401, the memory 402, and the transceiver 404 are all connected to the bus interface 403.

In this embodiment of this disclosure, the first communications device 400 further includes: a computer program stored on the memory 702 and capable of running on the processor 401.

In this embodiment of this disclose, the processor 401 is configured to:
delete a terminal capability identifier in a case that a first condition is met;
and/or
retain the terminal capability identifier in a case that a second condition is met.

The first condition includes at least one of the following:
a terminal moves between networks;
none of terminal capability identifiers in a source network are applicable to a target network;
a terminal moves between networks, and none of terminal capability identifiers in a source network are applicable to a target network; or
a terminal moves between networks, a terminal capability identifier is received from a second communications device, and none of terminal capability identifiers in a source network are applicable to a target network.

The second condition includes at least one of the following:
all terminal capability identifiers in a source network are applicable to a target network;
a terminal moves between networks, and all terminal capability identifiers in a source network are applicable to a target network; or
a terminal moves between networks, a terminal capability identifier is received from a second communications device, and all terminal capability identifiers in a source network are applicable to a target network.

Optionally, that none of terminal capability identifiers in a source network are applicable to a target network is indicated by an operator policy.

In another optional implementation, that all terminal capability identifiers in a source network are applicable to a target network is indicated by an operator policy.

In an optional implementation, the terminal capability identifier is included in a terminal context. When the terminal moves between the networks, the first communications device obtains the terminal context from the second communications device. The terminal context includes the terminal capability identifier. It is easy to understand that when the first communications device determines that the terminal has moved between networks, the first communications device deletes the communication capability identifier and obtains a terminal capability identifier of the terminal again, so as to guarantee secure and reliable use of the terminal capability identifier and reflect a real terminal capability. In another implementation, when the source network is trusted by the target network, the terminal capability identifier may be retained.

The network includes at least one of the following: a PLMN, an SNPN, or a CAG. Moving between networks is, for example, moving between PLMNs. The terminal moving from the source network to the target network is, for example, the terminal moving from a source PLMN to a target PLMN.

In an optional implementation of this embodiment, the first communications device is a communications device in the target network, and the second communications device is a communications device in the source network.

In an optional implementation of this embodiment, the communications device may include at least one of the following: an MME, an AMF, or UE.

In an optional implementation of this embodiment, the first communications device may include at least one of the following: a target MME or a new MME, and a target AMF or a new AMF. The target MME or the new MME may be a communications device in the target network. The target AMF or the new AMF may be a communications device in the target network.

In an optional implementation of this embodiment, the second communications device may include at least one of the following: a source MME or an original MME, and a source AMF or an original AMF. The source MME or the original MME may be a communications device in the source network. The source AMF or the original AMF may be a communications device in the source network.

In an optional implementation, moving between networks includes at least one of the following: moving between the networks when the terminal is in an idle state, moving between the networks when the terminal is in an inactive state, or moving between the networks when the terminal is in a connected state (for example, inter-network handover).

In an optional implementation, moving from the source network to the target network includes at least one of the following: moving from the source network to the target network when the terminal is in an idle state, moving between the networks when the terminal is in an inactive state, or moving from the source network to the target network when the terminal is in a connected state (for example, handover from the source network to the target network).

Embodiments of this disclosure further provide a computer-readable storage medium, where a computer program is stored in the computer-readable storage medium. When the computer program is executed by a processor, processes of the foregoing embodiments of the terminal capability identifier operation method are implemented, with the same technical effect achieved. To avoid repetition, details are not described herein again. The computer-readable storage medium is, for example, a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art may clearly understand that the methods in the foregoing embodiments may be implemented by using software in combination with a necessary universal hardware platform, and certainly may alternately be implemented by using hardware. In most cases, the former is a more preferred implementation. Based on such an understanding, the technical solutions of this disclosure essentially, or the part contributing to the related art, may be implemented in a form of a software product. The software product is stored in a storage medium (for example, a ROM or RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing embodiments of this disclosure are described with reference to the accompanying drawings. However, this disclosure is not limited to the foregoing specific implementations. The foregoing specific implementations are merely illustrative rather than restrictive. Inspired by the present disclosure, a person of ordinary skill in the art may still derive many variations without departing from the essence of the present disclosure and the protection scope of the claims. All these variations shall fall within the protection of the present disclosure.

What is claimed is:

1. A UE Radio Capability identifier (ID) operation method, applied to a first communications device and comprising:
   determining whether to delete the UE Radio Capability ID or retain the UE Radio Capability ID;
   wherein deleting the UE Radio Capability ID comprises:
   deleting the UE Radio Capability ID in a case that a first condition is met;
   the retaining the UE Radio Capability ID comprises:
      retaining the UE Radio Capability ID in a case that a second condition is met;
      wherein
      the first condition comprises at least one of the following:
      none of UE Radio Capability IDs in a source network are applicable to a target network;
      a terminal moves between networks, and none of UE Radio Capability IDs in a source network are applicable to a target network; or
      a terminal moves between networks, the UE Radio Capability ID is received from a second communications device, and none of UE Radio Capability IDs in a source network are applicable to a target network; and
      the second condition comprises at least one of the following:
      all UE Radio Capability IDs in a source network are applicable to a target network;
      a terminal moves between networks, and all UE Radio Capability IDs in a source network are applicable to a target network; or
      a terminal moves between networks, the UE Radio Capability ID is received from a second communications device, and all UE Radio Capability IDs in a source network are applicable to a target network;
   wherein the first communications device is a communications device in the target network; and the second communications device is a communications device in the source network;
   wherein the communications device in the target network is a target access and mobility management function (AMF) or a new AMF, or a target Mobility Management Entity (MME) or a new MME;
   wherein the second communications device is a source AMF or an old AMF, or a source MME or an old MME.

2. The method according to claim 1, wherein
   that none of UE Radio Capability ID in a source network are applicable to a target network is indicated by an operator policy; or
   that all UE Radio Capability ID in a source network are applicable to a target network is indicated by an operator policy.

3. The method according to claim 1, wherein that a terminal moves between networks comprises: the terminal moves from the source network to the target network.

4. The method according to claim 3, wherein that the terminal moves from the source network to the target network comprises: the terminal moves from a source public land mobile networks (PLMN) to a target PLMN.

5. A first communications device, comprising a processor, a memory, and a computer program stored in the memory and capable of running on the processor, wherein the computer program is executed by the processor to implement:
   determining whether to delete a user equipment (UE) Radio Capability identifier (ID) or retain the UE Radio Capability ID;
   wherein deleting the UE Radio Capability ID comprises:
   deleting the UE Radio Capability ID in a case that a first condition is met;
   the retaining the UE Radio Capability ID comprises:
   retaining the UE Radio Capability ID in a case that a second condition is met;
   wherein
   the first condition comprises at least one of the following:
   none of UE Radio Capability IDs in a source network are applicable to a target network;
   a terminal moves between networks, and none of UE Radio Capability IDs in a source network are applicable to a target network; or
   a terminal moves between networks, the UE Radio Capability ID is received from a second communications device, and none of UE Radio Capability IDs in a source network are applicable to a target network; and
   the second condition comprises at least one of the following:
   all UE Radio Capability IDs in a source network are applicable to a target network;
   a terminal moves between networks, and all UE Radio Capability IDs in a source network are applicable to a target network; or a terminal moves between networks, the UE Radio Capability ID is received from a second communications device, and all UE Radio Capability IDs in a source network are applicable to a target network;

wherein the first communications device is a communications device in the target network; and the second communications device is a communications device in the source network;

wherein the communications device in the target network is a target access and mobility management function (AMF) or a new AMF, or a target Mobility Management Entity (MME) or a new MME;

wherein the second communications device is a source AMF or an old AMF, or a source MME or an old MME.

6. The first communications device according to claim 5, wherein that none of UE Radio Capability ID in a source network are applicable to a target network is indicated by an operator policy; or that all UE Radio Capability ID in a source network are applicable to a target network is indicated by an operator policy.

7. The first communications device according to claim 5, wherein that a terminal moves between networks comprises: the terminal moves from the source network to the target network.

8. The first communications device according to claim 7, wherein that the terminal moves from the source network to the target network comprises: the terminal moves from a source public land mobile networks (PLMN) to a target PLMN.

9. A non-transitory computer-readable storage medium, wherein the computer-readable storage medium stores a computer program, and the computer program is executed by a processor of a first communications device to implement:

determining whether to delete a user equipment (UE) Radio Capability identifier (ID) or retain the UE Radio Capability ID;

wherein deleting the UE Radio Capability ID comprises:

deleting the UE Radio Capability ID in a case that a first condition is met;

the retaining the UE Radio Capability ID comprises:

retaining the UE Radio Capability ID in a case that a second condition is met;

wherein the first condition comprises at least one of the following:

none of UE Radio Capability IDs in a source network are applicable to a target network;

a terminal moves between networks, and none of UE Radio Capability IDs in a source network are applicable to a target network; or a terminal moves between networks, the UE Radio Capability ID is received from a second communications device, and none of UE Radio Capability IDs in a source network are applicable to a target network; and the second condition comprises at least one of the following:

all UE Radio Capability IDs in a source network are applicable to a target network;

a terminal moves between networks, and all UE Radio Capability IDs in a source network are applicable to a target network; or a terminal moves between networks, the UE Radio Capability ID is received from a second communications device, and all UE Radio Capability IDs in a source network are applicable to a target network;

wherein the first communications device is a communications device in the target network; and the second communications device is a communications device in the source network;

wherein the communications device in the target network is a target access and mobility management function (AMF) or a new AMF, or a target Mobility Management Entity (MME) or a new MME;

wherein the second communications device is a source AMF or an old AMF, or a source MME or an old MME.

10. The non-transitory computer-readable storage medium according to claim 9, wherein that none of UE Radio Capability ID in a source network are applicable to a target network is indicated by an operator policy; or that all UE Radio Capability ID in a source network are applicable to a target network is indicated by an operator policy.

11. The non-transitory computer-readable storage medium according to claim 9, wherein that a terminal moves between networks comprises: the terminal moves from the source network to the target network.

12. The non-transitory computer-readable storage medium according to claim 11, wherein that the terminal moves from the source network to the target network comprises: the terminal moves from a source public land mobile networks (PLMN) to a target PLMN.

* * * * *